US008169362B2

(12) United States Patent
Cook et al.

(10) Patent No.: US 8,169,362 B2
(45) Date of Patent: May 1, 2012

(54) MOBILE SENSE THROUGH THE WALL RADAR SYSTEM

(75) Inventors: Carl D. Cook, La Habra, CA (US);
Scott E. Adcook, Irvine, CA (US);
Michael D. Lee, Aliso Viejo, CA (US);
Mena J. Ghebranious, Cerritos, CA (US)

(73) Assignee: Raytheon Company, Waltham, MA (US)

( * ) Notice: Subject to any disclaimer, the term of this patent is extended or adjusted under 35 U.S.C. 154(b) by 467 days.

(21) Appl. No.: 12/462,378

(22) Filed: Aug. 3, 2009

(65) Prior Publication Data
US 2011/0025546 A1 Feb. 3, 2011

(51) Int. Cl.
*G01S 13/538* (2006.01)
*G01S 13/52* (2006.01)
(52) U.S. Cl. .......................... 342/162; 342/22
(58) Field of Classification Search ............ 342/22, 342/162
See application file for complete search history.

(56) References Cited

U.S. PATENT DOCUMENTS

| | | | |
|---|---|---|---|
| 5,446,461 A | 8/1995 | Frazier | |
| 6,466,155 B2 | 10/2002 | Taylor et al. | |
| 6,982,668 B1* | 1/2006 | Doerry et al. | 342/160 |
| 7,345,618 B1* | 3/2008 | Cole et al. | 342/22 |
| 7,920,088 B2* | 4/2011 | Thompson et al. | 342/90 |
| 2006/0028369 A1 | 2/2006 | Rausch et al. | |
| 2007/0132634 A1 | 6/2007 | Wakeman | |
| 2009/0262005 A1* | 10/2009 | McNeill et al. | 342/22 |
| 2009/0262006 A1* | 10/2009 | McNeill et al. | 342/22 |
| 2010/0109938 A1* | 5/2010 | Oswald et al. | 342/90 |
| 2011/0148686 A1* | 6/2011 | Cole et al. | 342/22 |

FOREIGN PATENT DOCUMENTS
WO WO 2008/001092 A2 1/2008

OTHER PUBLICATIONS

Martone et al. "Moving Target Indication for Transparent Urban Structures." Army Research Laboratory. May 2009.*
Written Opinion of the International Searching Authority for International Application No. PCT/US2010/044309, filed Aug. 3, 2010, Written Opinion dated Dec. 6, 2010 and mailed Dec. 13, 2010 (6 pgs).
International Search Report for International Application No. PCT/US2010/044309, filed Aug. 3, 2010, International Search Report dated Dec. 6, 2010 and mailed Dec. 13, 2010 (3 pgs.).

* cited by examiner

*Primary Examiner* — Thomas Tarcza
*Assistant Examiner* — Matthew M Barker
(74) *Attorney, Agent, or Firm* — Christie, Parker & Hale, LLP

(57) ABSTRACT

A method and apparatus for sensing a target through a wall or obstruction by a Moving Target Indicator (MTI) radar sensor. In an exemplary embodiment, a series of radar pulses are transmitted at frequencies less than about 5 GHz. Radar return signals are received at a plurality of receive antenna array subapertures. The radar return signals are processed by a digital beamformer to form multiple beams. Target detection processing detects moving and stationary targets through a plurality of parallel target detection signal processing paths.

21 Claims, 15 Drawing Sheets

Average Correlation Coefficient Matrix for High Pass Filtered Range Doppler Maps

MOBILE SENSE THROUGH THE WALL RADAR SYSTEM

This invention was made with Government support under Contract No. W15P7T-05-C-P616 awarded by the Department of the Army. The Government has certain rights in this invention.

BACKGROUND

Through wall radar sensors provide users with a stand-off capability to detect, locate, and "see" personnel who are hidden behind walls, doors and other obstructions. Soldiers and law enforcement personnel are confronted with situations where an unknown number of adversaries hold unknown positions inside of buildings. Gaining real time situational awareness on the location of personnel occupying adjacent buildings or rooms ensures the safety and effectiveness of an assaulting force. Exemplary "sense through the wall" (STTW) applications include urban combat, law enforcement, and fire, search and rescue.

SUMMARY OF THE DISCLOSURE

A method and apparatus are disclosed for sensing a target through a wall or obstruction by a Moving Target Indicator (MTI) radar sensor. In an exemplary embodiment, a series of radar pulses are transmitted at frequencies less than about 5 GHz. Radar return signals are received at a plurality of receive antenna array subapertures. The radar return signals are processed by a digital beamformer to form multiple beams. Target detection processing detects moving and stationary targets through a plurality of parallel target detection signal processing paths.

BRIEF DESCRIPTION OF THE DRAWINGS

Features and advantages of the disclosure will readily be appreciated by persons skilled in the art from the following detailed description when read in conjunction with the drawing wherein.

DETAILED DESCRIPTION

Figure 1:
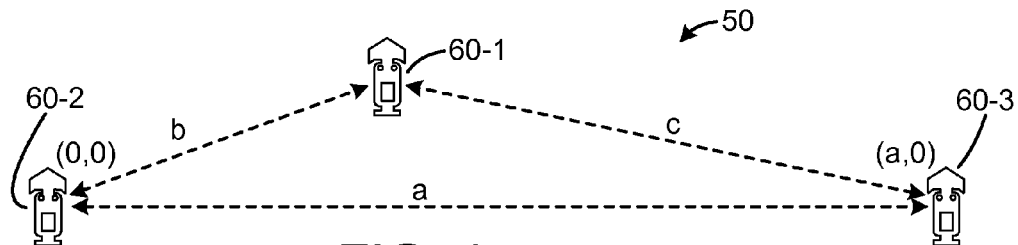
FIG. 1 diagrammatically illustrates an exemplary sensor network of distributed sensor nodes.

In the following detailed description and in the several figures of the drawing, like elements are identified with like reference numerals. The figures are not to scale, and relative feature sizes may be exaggerated for illustrative purposes.

Exemplary embodiments of a sensor system address the STTW application with exemplary low power and small size hardware implementations that may employ one or more of such features as multiple subapertures and associated receiver channels, frequency modulated constant wave (FMCW) (stepped or swept) waveforms, analog range compensation and antenna leakage suppression, digital beamforming, Doppler processing, coherent change detection applied to range-Doppler maps, target detection based on correlation coefficient characteristics of the change detection maps, phase monopulse for angle estimation, Kalman filter for target tracking, a graphical user interface, and battery power source. For moving targets in buildings, low pulse-repetition frequencies may be utilized where radar transmit and receive circuits are powered down in-between pulses to reduce overall power consumption. One exemplary 2-channel sensor system may consume less than 5 watts continuous and provide several hours of operation using commercial AA batteries.

An exemplary embodiment of a radar system architecture may provide up to 40 meters stand-off detection of range and azimuth to multiple moving targets through cement walls in a lightweight mobile or hand held device that operates using a battery source. An embodiment for hand held use may include motion compensation to cancel user imposed sensor motion. An embodiment for higher cross range resolution may include a built-in cooperative wireless networked sensor mode, to enable a multi-mode sensor network with a non-coherent tri-lateration algorithm embedded in each node to minimizes wireless data network traffic and eliminate a need for an additional processing and data distribution node.

In one exemplary embodiment, a plurality of mobile sensor nodes is employed in the system, with the plurality of sensor nodes forming a sensor network. FIG. 1 diagrammatically illustrates an exemplary sensor network 50, including distributed sensor nodes 60-1, 60-2 and 60-3. Each sensor node is typically associated with a sensor system which may be portable or mobile, and its position in relation to the other nodes may change as a function of time. For an STTW radar application, each sensor node may be associated with a mobile hand-held or vehicle mounted radar sensor system forming part of a distributed aperture.

Figure 2:
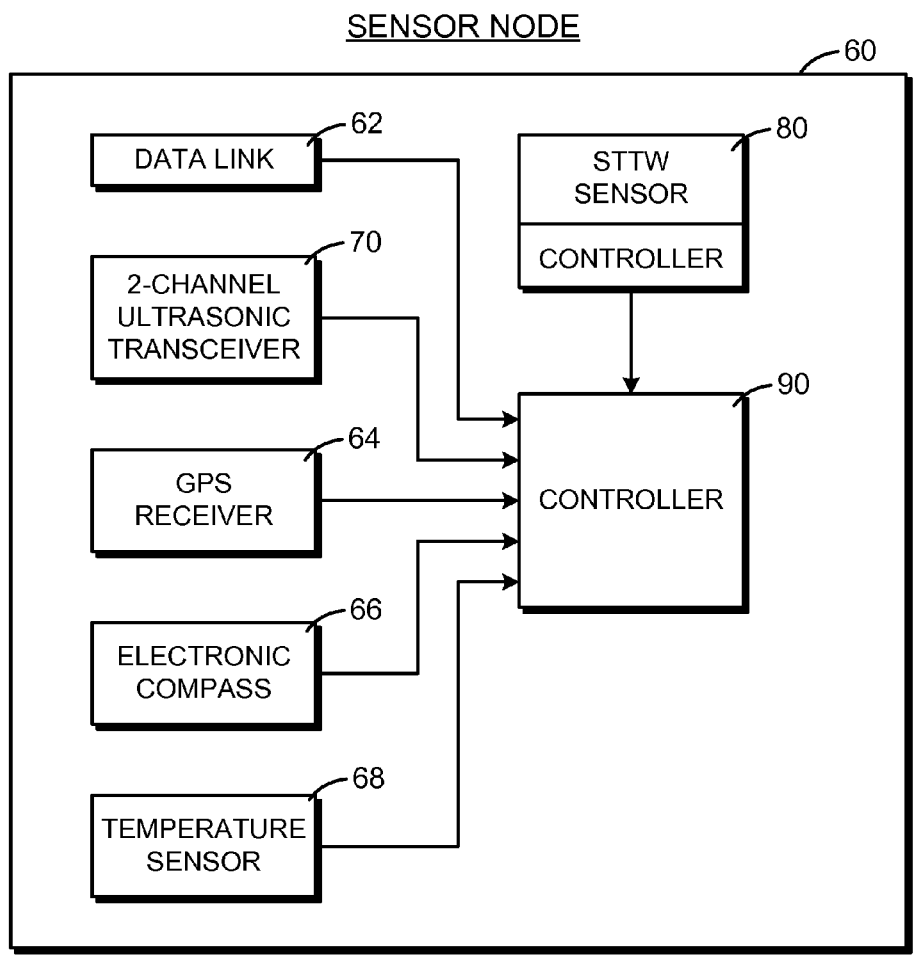
FIG. 2 is a simplified schematic block diagram of an exemplary sensor node.

For an exemplary embodiment, each sensor node may include a low bandwidth wireless data link, a 2-channel ultrasonic transceiver, a standard GPS receiver, and an electronic compass. FIG. 2 is a simplified schematic block diagram of an exemplary sensor node 60, which includes the data link 62, a GPS receiver 64, an electronic compass 66 and a temperature sensor 68. In an exemplary embodiment, the wireless data link may employ a standard TCP/IP interface on the sensor node, connected to an external radio, such as, by way of example only, a Raytheon MicroLight™ radio.

In an exemplary embodiment, each sensor node may also include a two channel ultrasonic transceiver 70, the associated STTW sensor 80 and a controller 90. The controller may include a microprocessor or an ASIC, for example, to control operations of the sensor node. GPS coordinates provided by the GPS receiver may be used by the sensor data network to automate ad-hoc networking between nearby sensors, i.e. sensors located nearby each other such that they are candidates for forming a cooperative network. In an exemplary application, for example, the sensors located within 15 meters or so of each other may form a cooperative sensor network.

Figure 3:
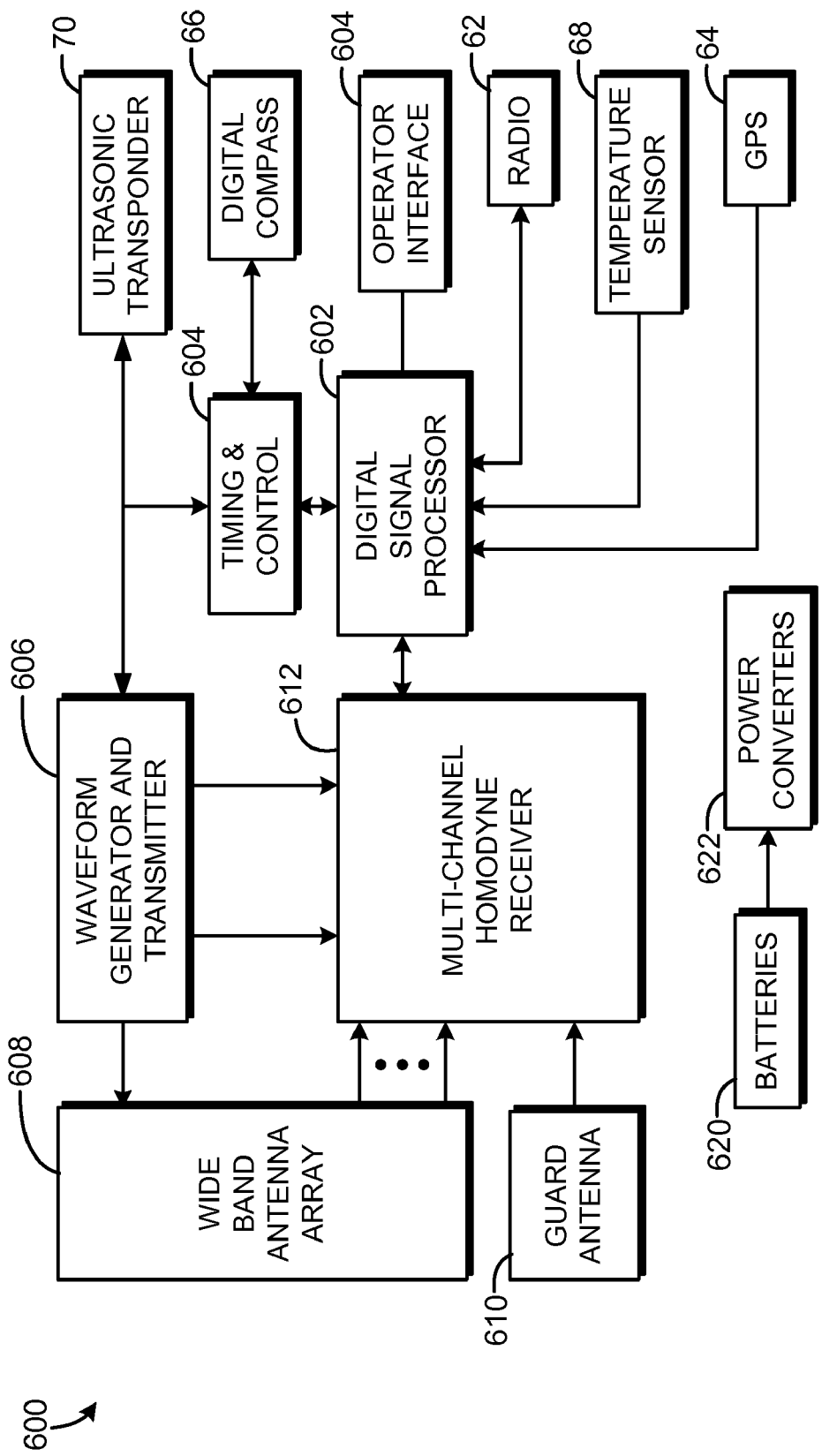
FIG. 3 is a schematic block diagram of an STTW sensor.

FIG. 3 is a schematic block diagram of elements of an exemplary STTW sensor 600. This embodiment may be used in a sensor network as illustrated in FIG. 1, or may be used in a stand-alone application. As with the embodiment of FIG. 2, the sensor 600 includes a data link provided by radio 62, a GPS receiver 64, a digital compass 66 and a temperature sensor 68. For stand-alone applications, the sensor 600 may omit one or more of the ultrasonic transponder 70, the GPS receiver 64 and digital compass 66, to reduce weight, size, cost and power consumption. The sensor includes a radar data processor 602 such as a digital signal processor (DSP), timing and control module 604 and a radar waveform generator and transmitter 606. The transmitter signals are provided to a wideband antenna array 608, which is also connected to a multi-channel receiver 612. A guard antenna 610 is connected to the receiver as well. Electrical power for the sensor is provided in this embodiment by standard AA batteries 620 and DC-DC power converters 622.

Figure 4A:
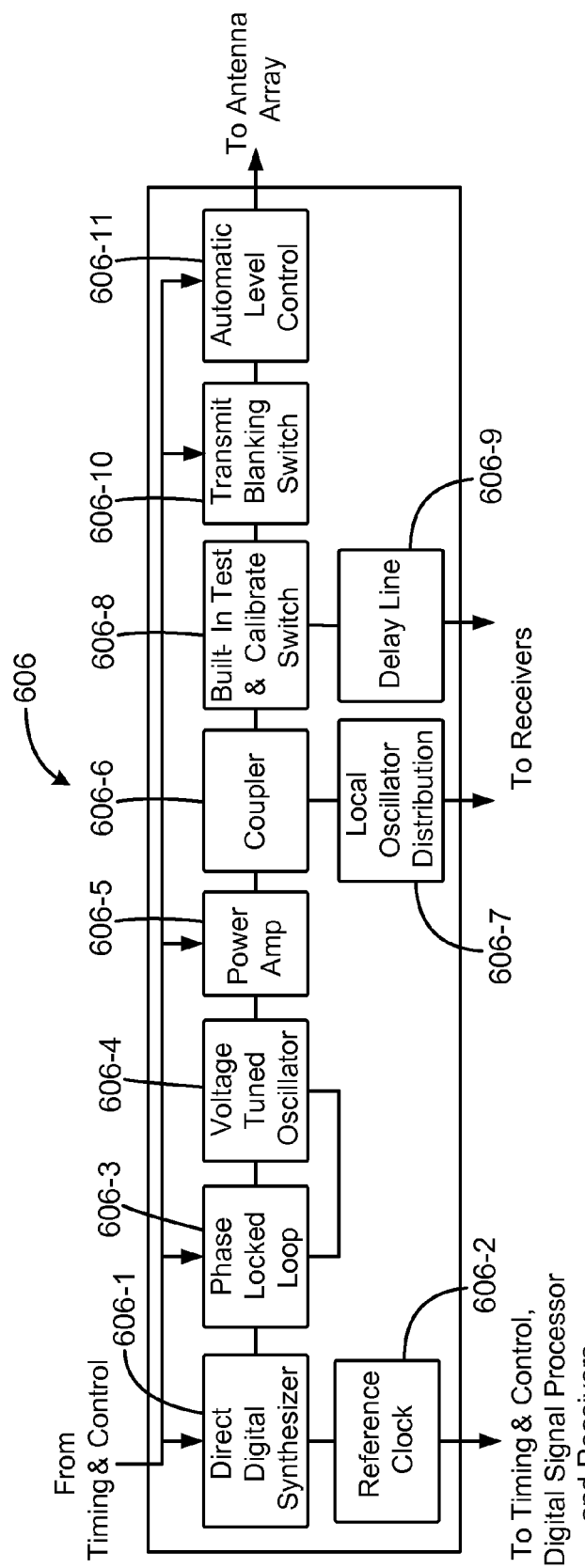
FIG. 4A is a schematic block diagram of an exemplary embodiment of a waveform generator and transmitter module for the sensor of FIG. 3.

FIG. 4A is a schematic block diagram of an exemplary embodiment of a waveform generator and transmitter module 606. The module 606 includes a waveform generator provided by direct digital synthesizer 606-1, reference clock 606-2, phase-locked-loop (PLL) 606-3, voltage tuned oscillator (VCO) 606-4 and an RF amplifier 606-5. The output of the amplifier 606-5 is passed to coupler 606-6, and one coupler output is connected through a built-in test and calibration switch 606-8, transmit blanking switch 606-10 and automatic level control 606-11 to the antenna array. The automatic level control 606-11 monitors the amplitude and adjusts the transmitted power levels to an optimum level. The second output from the coupler 606-6 is connected to local oscillator distribution 606-7 to the receiver 612. The switch 606-8 allows the transmitter output to be passed through a delay line 606-9 to the receiver 612 for test utilization, in this exemplary embodiment. The transmitter operates, in exemplary embodiments, at L band or S band frequencies, and generally at operating frequencies less than about 5 GHz.

Figure 4B:
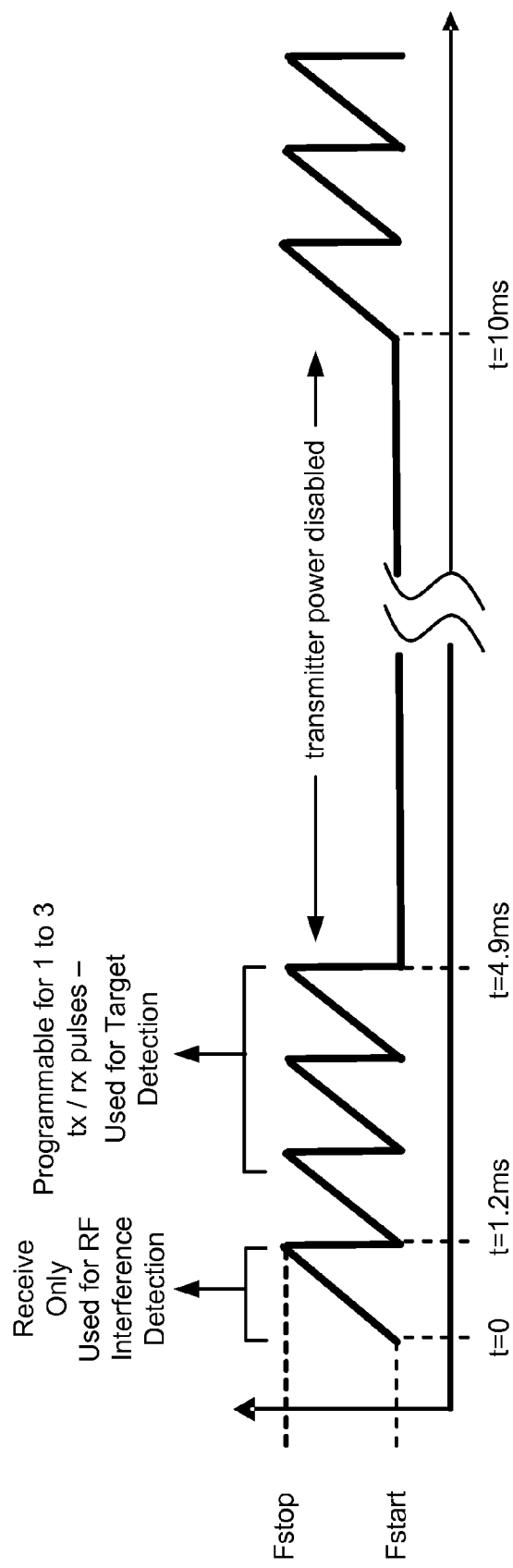
FIG. 4B depicts an exemplary pulse train used by the system of FIG. 3.
Figure 6:
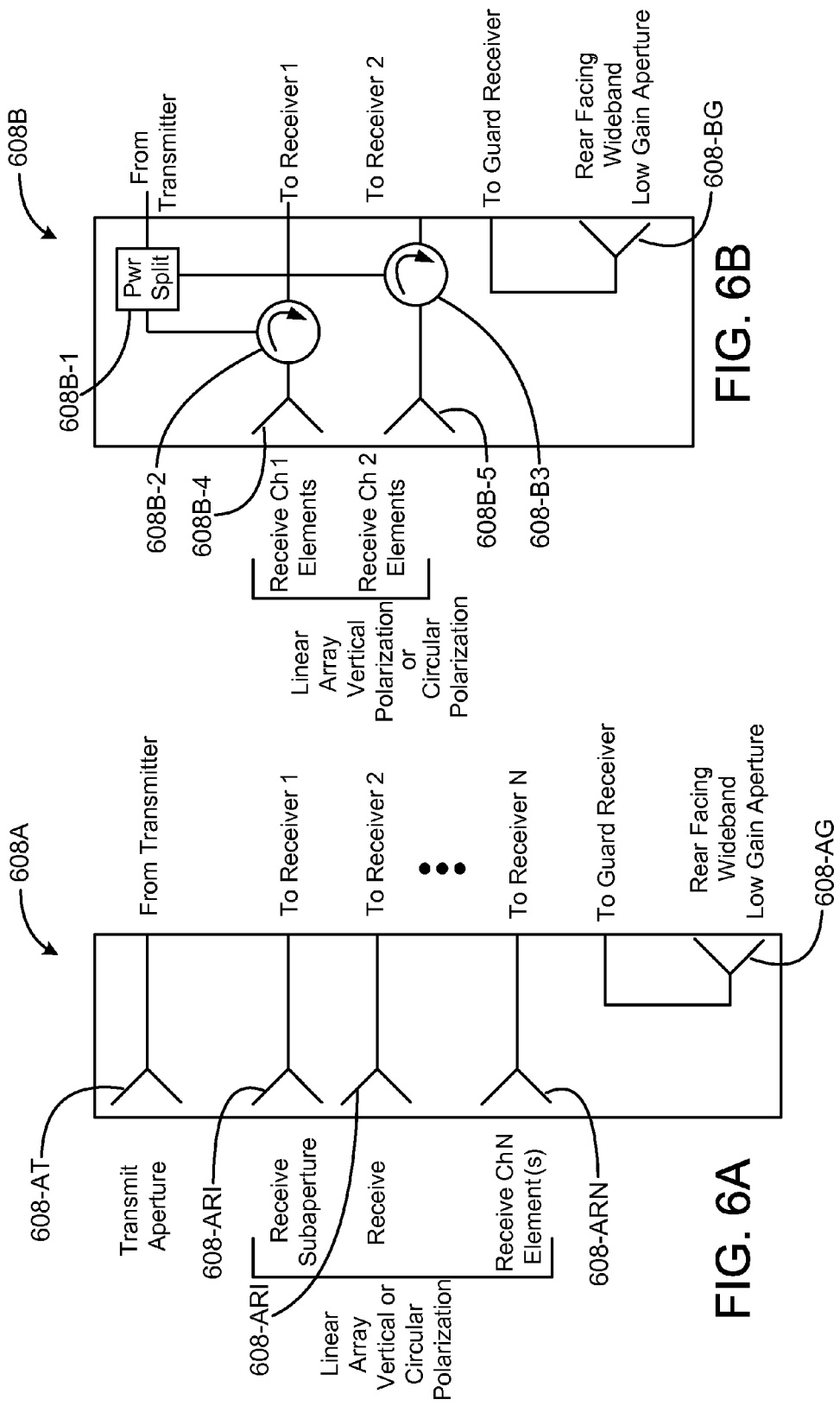
FIGS. 6A and 6B are respective schematic diagrams of respective exemplary embodiments of an antenna array for the sensor of FIG. 3.

In an exemplary embodiment, the module 606 generates a dual PRF linear FM chirp with programmable bandwidth and time duration. In an exemplary embodiment, a pulse burst consisting of 1 to 4 one millisecond linear chirped pulses is transmitted at a ten millisecond pulse group repetition interval (100 Hz rate), as shown in FIG. 4B. The duty cycle of the pulse train enables power savings as the transmitter and receiver circuits are powered down during the intra-pulse periods. The transmitter is coupled to a transmit antenna system, e.g. transmit element 608-AT (FIG. 6A). During a transmit pulse, the receiver 612 simultaneously samples the input from multiple receive antenna array subapertures forming what is commonly referred to as an FMCW system. In one embodiment the transmit signal is coupled directly to a wideband antenna subaperture 608A, and each of N receive subapertures are coupled to an independent receive channel as shown in FIG. 6A. In another embodiment of an array 608B illustrated in FIG. 6B, the transmit pulse is split by power splitter 608B-1 and coupled to two antenna subapertures 608B-4 and 608B-5 via circulators 608B-2 and 608B-3 where the circulators provide sufficient transmitter to receiver leakage isolation. In each case, the received pulses are converted to baseband using a homodyne receiver where a time delayed copy of the transmit signal is used as a local oscillator signal for an RF converter. An analog high pass filter in the baseband signal path is used to compensate for the range based signal attenuation. This range compensation block equalizes the range dependent amplitudes of the analog signals in preparation for digital conversion and suppresses the transmit signal leaking into the receiver which would normally limit the dynamic range at the ADC. The FMCW waveform and the homodyne converter provide a very narrowband signal to a low power, high resolution ADC.

Figure 5:
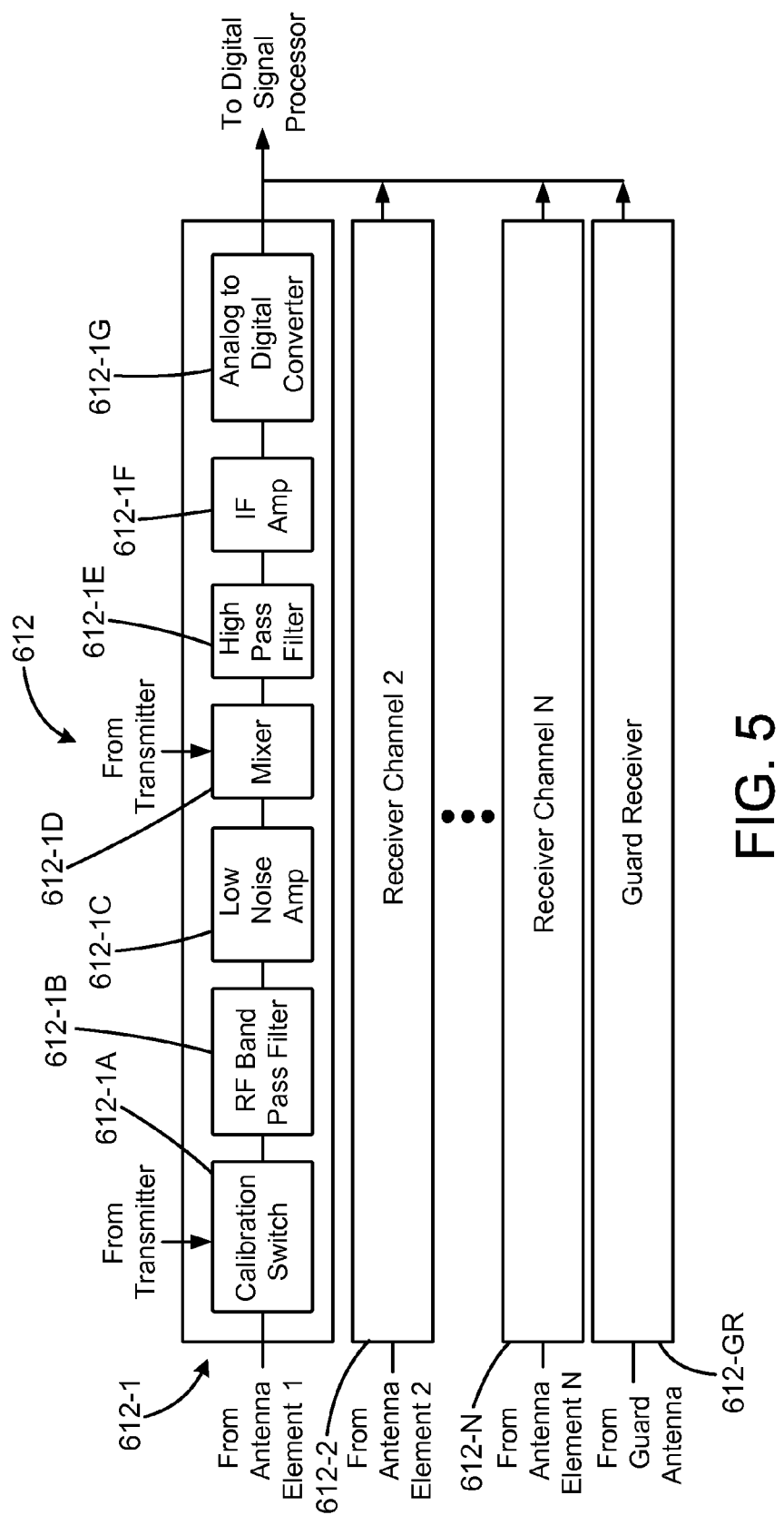
FIG. 5 is a schematic diagram illustrating an exemplary embodiment of a multi-channel receiver for the sensor of FIG. 3.

The exemplary embodiment of a multi-channel receiver 612 depicted in FIG. 5 includes receiver channels 612-1, 612-2, . . . 612-N, respectively coupled to receive signals from antenna element 1, antenna element 2, . . . antenna element N, as well as a guard receiver 612-GR coupled to a guard antenna (e.g., 608AG in FIG. 6A or 608BG in FIG. 6B). The guard antenna channel may be used to provide a detection method for undesired moving targets to the sides and back of the sensor, including the users. In one implementation (illustrated in FIG. 6A) suited for robot or vehicle mount sensors, the receive antenna array 608A includes multiple, e.g. eight, subapertures or antenna elements 608AR1 . . . 608ARN each connected directly to an independent receiver channel (one of channels 612-1, 612-2, . . . 612-N) where isolation between transmit and receive antennas is achieved due to physical separation of transmit and receive apertures. In an implementation suited for smaller hand held sensors, the receive array 608A includes two subapertures, or antenna elements, each connected to an independent receiver channel. In a second implementation of a two channel sensor (illustrated in FIG. 6B), the receive array 608 includes two subapertures 608B-4 and 608B-5 coupled to two receive channels through respective circulators 608B-2 and 608B-3 where the circulator provides sufficient transmitter to receiver leakage isolation. Each antenna configuration may also include a backwards facing guard antenna connected to an independent guard channel.

Other receive channel counts can be used depending on the maximum receive antenna gain desired for a given application.

FIG. 5 illustrates elements of exemplary receiver channel 612-1; the other channels are similar. The receiver channel 612-1 includes a calibration switch 612-1A which allows as input to the channel either the signals received from the antenna element 1 for normal operation, or transmit signals passed through the delay line 606-9 from the transmitter, for use in calibration/testing. The input RF signals are passed through RF band pass filter 612-1B, and through low noise amplifier 612-1C to mixer 612-1D for demodulation and conversion to baseband. A time delayed copy of the transmit signal is used as a local oscillator signal for mixer 612-1D. An analog high pass filter 612-1E and IF amplifier 612-1F compensate for the range based signal attenuation. This range compensation equalizes the range dependent amplitudes of the analog signals in preparation for digital conversion by ADC 612-1G and suppresses the transmit signal leaking into the receiver which would normally limit the dynamic range at the ADC. The FMCW waveform and the homodyne converter provide a very narrowband signal to the low power, high resolution ADC 612-1G. The digitized output of each channel is provided to the digital signal processor 602.

In an exemplary embodiment, the STTW radar digital signal processing may be optimized to provide reduced processing time and power as compared to typical Doppler radar approaches. This enables the small size and low power dissipation for hand held devices. The DSP 602 includes digital I/Q and channel equalization functions 602-1 and 602-2 which provide complex time samples of the radar return signals. The complex time samples are processed by a digital beamformer 602-3 and are stored in memory 602-4. The resulting data is processed by range compression FFT function 602-5, and a clutter reference cell is detected from the range bins at 602-6 for use in a sensor motion compensation function. An initial phase reference is stored at 602-7. The clutter reference phase shift is measured or calculated at 602-8, and used to calculate a sensor motion compensation coefficient or correction factor at 602-9. At 602-11, the original complex time samples are complex multiplied by multiplier 602-11, and the new motion-compensated complex time samples are processed by the range compression block 602-12, the Doppler compression 602-13, and target detection processing 650. The output of the target detection processing is provided to the operator interface 670 which includes in one exemplary embodiment a display with a graphical user interface.

In the digital signal processor, 602, the received 1 KHz rate pulses (defined as one scan as a group) are time averaged in each channel, and the real samples are converted to in-phase and quadrature signal components at digital I/Q function 602-1. The resulting time domain samples are applied to a channel equalization filter 602A-3 which provides gain and phase matching from channel to channel. Platform motion compensation corrections may be derived by a motion compensation function generally implemented by functions 602-4 through 602-9 and applied by multiplier 602-11 to the time domain samples, mitigating the impact of small sensor motion associated with hand held operation. A technique for deriving and applying platform motion compensation is described in co-pending, commonly assigned patent application Ser. No. 12/462,366 (Now U.S. Pat. No. 7,978,124), the entire contents of which are incorporated herein by this reference.

In an exemplary embodiment, an N to M channel digital beamformer 602-3 may be used to form multiple fixed but overlapping beams spaced across the radar field of view. For example, in one exemplary robot mounted embodiment of an STTW sensor, eight receive apertures and associated digital receivers may be used to form five beams. In an exemplary hand held implementation, two receive subapertures are used to form two beams. The M beamformer real and imaginary (I and Q) time sample outputs from beamformer 602-3 are multiplexed through a range compression FFT processor function 602-5, resulting in a range matrix map of clutter and targets for each channel. The output of the processor function 602-5 may be fed to a large clutter detector 602-6 whose output is fed to the motion compensation function implemented as functions 602-7 through 602-9.

Figure 7:
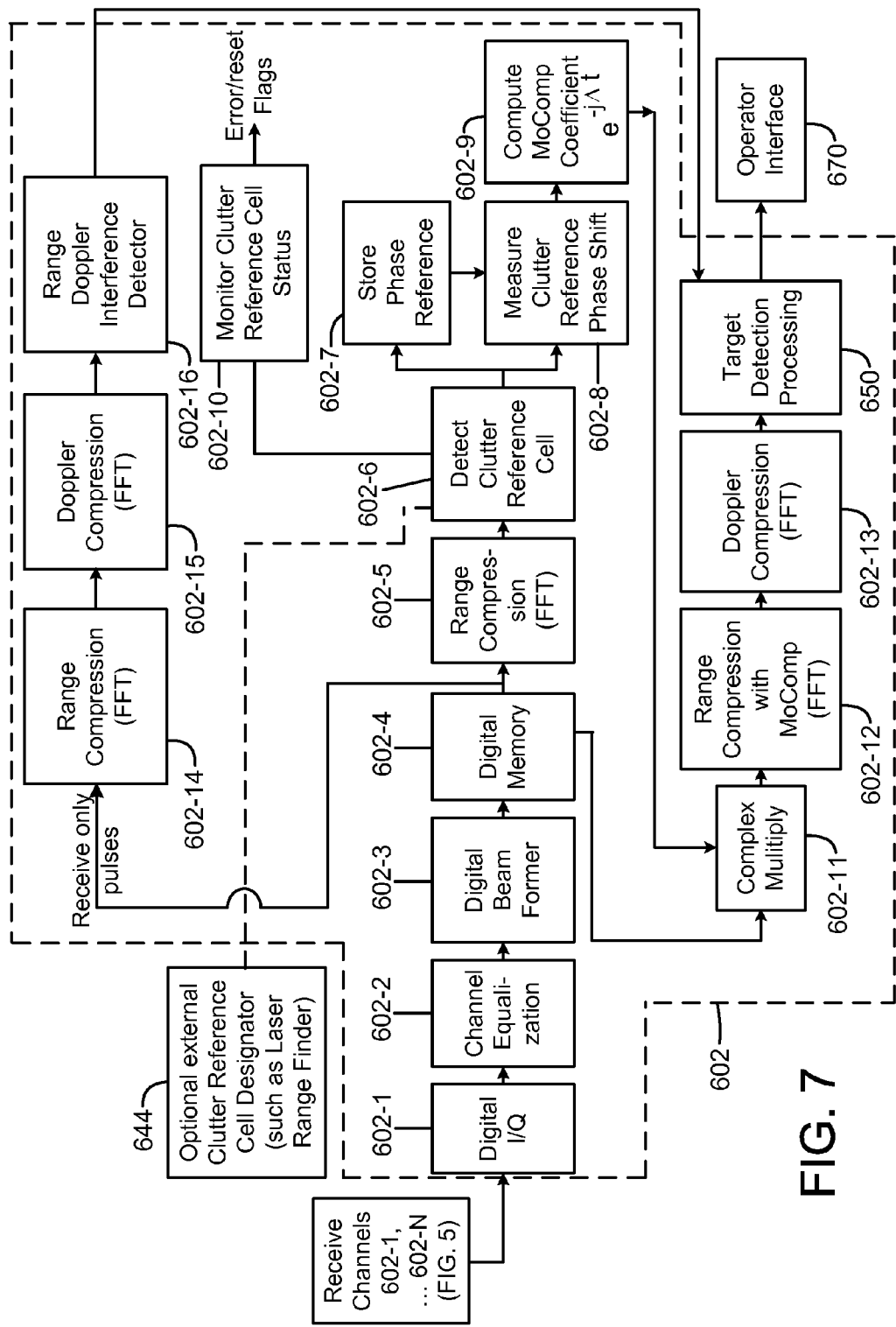
FIG. 7 is a schematic block diagram of an exemplary embodiment of the radar digital signal processor for the sensor of FIG. 3.
Figure 8:
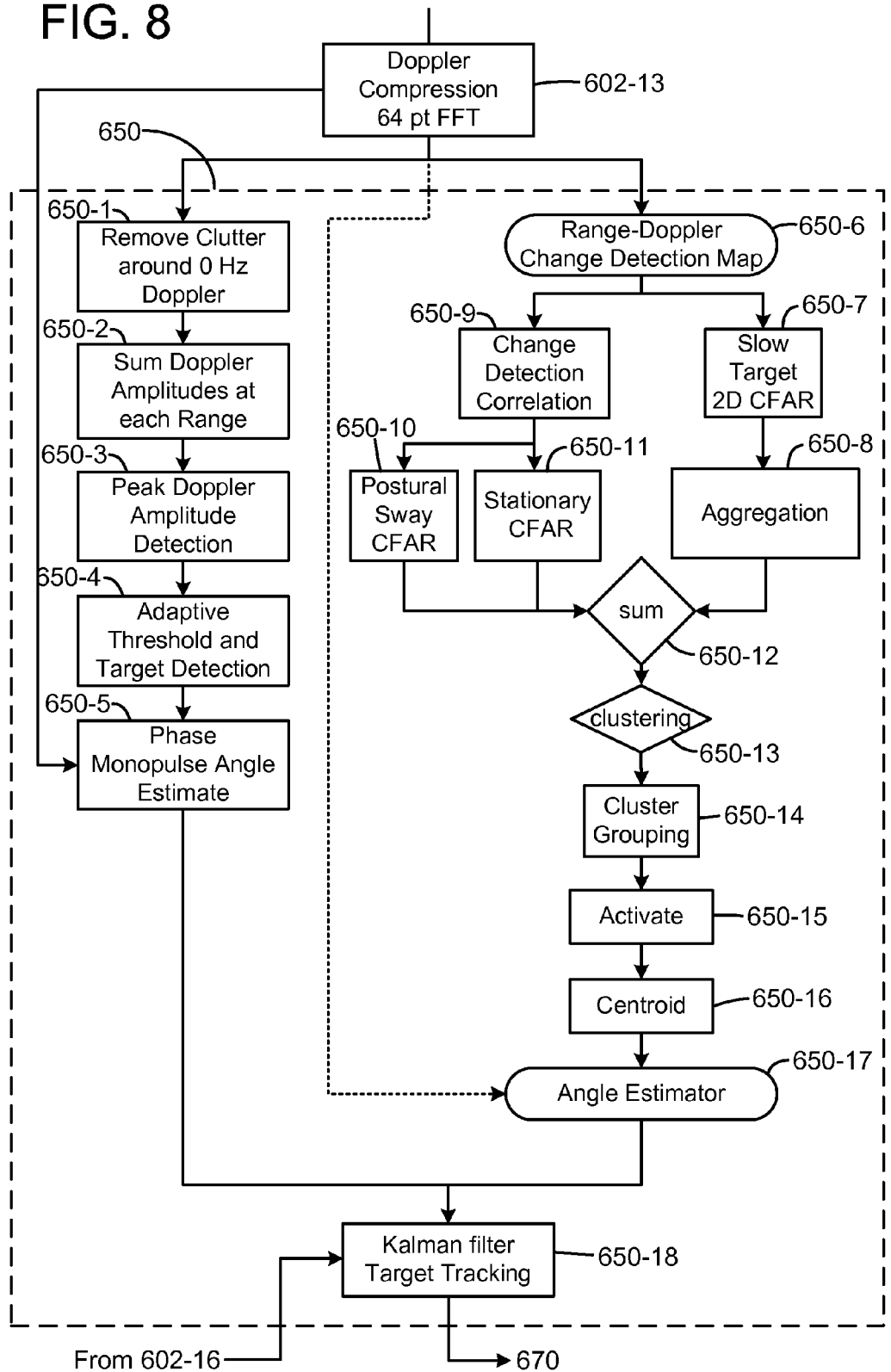
FIG. 8 is a functional flow diagram illustrating an exemplary target detection technique implemented in a sensor as in FIG. 3.

The radar processor is configured to determine if high levels of RF interference exists in the sensor's operating environment. For the first pulse in each pulse burst, the transmit blanking switch 606-10 is actuated to prevent transmission of the first pulse; the pulse is used for the generating the local oscillator for the receiver. The "receive only" pulse is illustrated in FIG. 4B. The receiver operates during the receive only mode for the first pulse to detect RF interference which may affect operation of the sensor, since any received signals are due to interference and not to radar return signals. The output from one of the receiver channels is provided to a complex FFT processor 602-14 to form a range matrix map. A second complex 2-D FFT 602-15 is performed using the range matrix map inputs to form a range-Doppler map. A detector 602-16 implements a fixed threshold for each range-Doppler map to test for noise and interference levels that would compromise performance of the moving target detector. Interference detector outputs are provided as inputs to the Kalman tracking filter 650-18 (FIG. 8) included in the target detection function 650 (FIG. 7) and may be used to terminate false target tracks corresponding to interference detections. Sensor coverage areas affected by interference may be tracked and provided to the operator display After motion compensation 602-4 through 602-11, the beamformer real and imaginary (I and Q) time sample outputs are multiplexed through a complex FFT processor 602-12, resulting in a range matrix map of clutter and targets for each channel. Motion compensation may be omitted for some applications, e.g. a sensor mounted in a fixed location and not susceptible to user sway or motion, in which case, functions 602-4 through 602-11 may be omitted.

To measure moving target velocities at each range, the Doppler compression block 602-13 performs a two dimensional (2D) FFT over multiple range matrix maps comprising a given coherent processing interval.

The simultaneous detection of both walking and stationary targets is addressed by three parallel target detection signal processing paths. An exemplary embodiment of the target detection processing 650 is illustrated in the functional block diagram of FIG. 8.

Walking targets are first identified in range based on the Doppler filter amplitudes in each channel using an adaptive detection threshold. In an exemplary embodiment, Doppler cells around zero hertz containing stationary clutter signals are excised at 650-1. Energy in the remaining Doppler filters is summed at each range bin in 650-2. Candidate test cells in range are identified by calculating a second derivative at each range bin to find Doppler energy peaks at 650-3. A Lesser-Of Constant False Alarm Rate (LO-CFAR) algorithm that computes an adaptive threshold to compare to the test cell amplitude for the subset of test cells is performed at 650-4. This greatly reduces the number of range bins for which computationally intensive threshold calculations are performed, leading to more efficient detection. The target detections from each channel feed a phase monopulse angle estimator 650-5. Each detected target is centroided to a single range-Doppler cell and the angle is estimated by measuring the phase difference between the signals that are incident on two subarrays formed by the beamformer and spaced a half wavelength apart. The range and angle of detected targets are input to a Kalman tracking filter 650-18.

Figure 9:
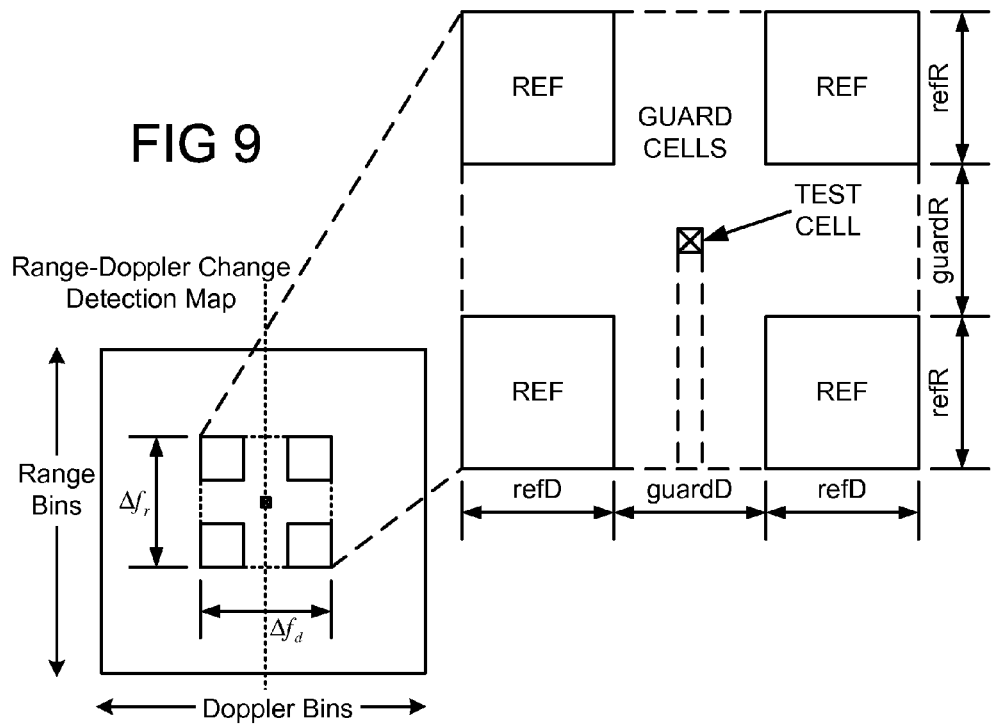
FIG. 9 illustrates the test, guard, and reference cells used by an exemplary two-dimensional (2D) CFAR algorithm at each range-Doppler cell of a coherent change detection map.
Figure 10:
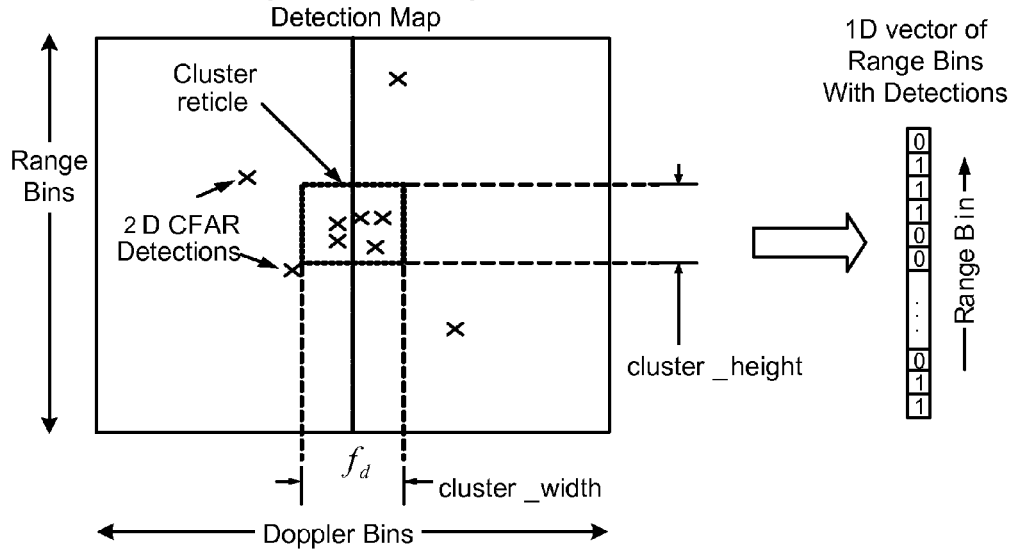
FIG. 10 illustrates the use of an exemplary 2-D range-Doppler window to condense an array of 2-D (range-Doppler) detections into a one-dimensional (1-D) array of detections versus range.

A separate detection process is used for targets that exhibit very small and even involuntary motion consistent with standing or sitting in one spot. This detector is optimized to take advantage of range-Doppler characteristics of targets located in severe multi-path environments such as inside a building. To detect targets with radial velocities very near zero Hz, subsequent range-Doppler maps from 602-13 are filtered using a Finite Impulse Response (FIR) high pass filter 650-6 to form a coherent range-Doppler change detection map which indicates phase and amplitude changes over time in each range-Doppler cell. Further, a correlation coefficient matrix is computed from the coherent change detection map to provide a statistical measure of how correlated the change detection spectra are at a given pair of range bins. Three different detection processes are then applied specific to different observed target characteristics in the change detection map and in the correlation coefficient matrix of the change detection map. The first detector 650-7 is optimized for slow moving targets. The high pass filtered range-Doppler map is input to a modified 2D CFAR detector in which the set of reference cells is a subset of the standard 2D CFAR reference cells as shown in FIG. 9 such that reference cells in the range and Doppler axes are not used. FIG. 9 illustrates the guard and reference cells used on the range-Doppler matrix relative to a given range-Doppler test cell for the 2D CFAR calculation. FIG. 9 also illustrates the use of a 2-D range-Doppler window to condense an array of 2-D (range-Doppler) detections into a one-dimensional (1-D) array of detections versus range. The Aggregation block 650-8 condenses the detections across range-Doppler cells into a 1-D array of detections versus range. In an exemplary embodiment a sliding range-Doppler window is applied across a subset of the array of range-Doppler cells in the change detection map, and detections within the window are summed and compared to a threshold. For any test location where the number of 2-D detections exceeds a fixed threshold, then a detection is declared in the corresponding range bin, as illustrated in FIG. 10.

Figure 11A:
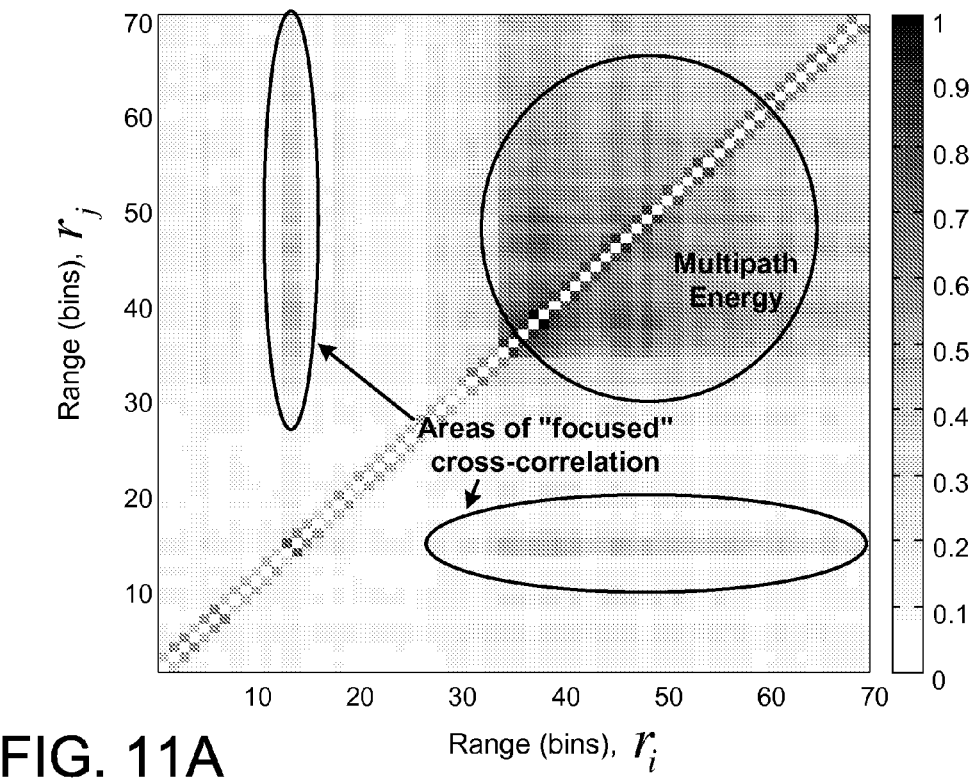
FIG. 11A is an example of a typical correlation coefficient matrix computed from a range-Doppler coherent change detection map for a human target with involuntary postural sway in a building or other severe multi-path environment.
Figure 11B:
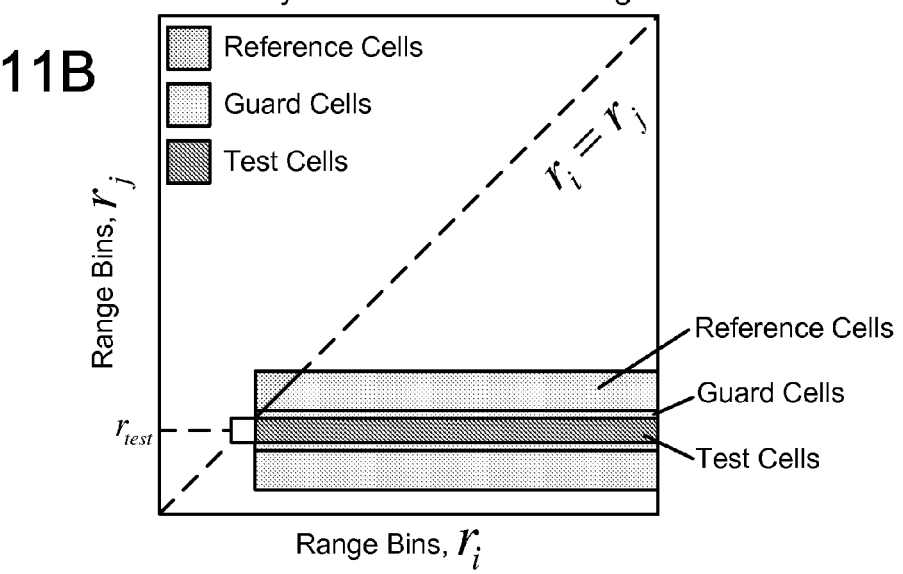
FIG. 11B illustrates the configuration of the test, guard, and reference cells used for an exemplary embodiment of a CFAR detector that operates on the correlation coefficient matrix of a coherent change detection map to detect still targets with involuntary postural sway.

Operation in parallel with detector 650-7 is a second detection process optimized for targets intentionally standing very still. This detector leverages the cross-correlation signature of the Doppler spectra of a standing target and its multipath echoes in a multipath environment. An averaged correlation coefficient map is generated for several high pass filtered range-Doppler maps 650-9. The correlation coefficients for each range bin pair $(r_i, r_j)$ are averaged over a given number of correlation coefficient matrices. The correlation coefficient averages from adjacent range bins are used as references. At 650-10, a CFAR algorithm uses the reference values to derive an adaptive threshold to compare with the test values. An example of a typical correlation coefficient matrix computed from the range-Doppler change detection map is shown in FIG. 11A for a target exhibiting only involuntary postural sway located in a high multi-path environment. The test values are defined as the average of the correlation coefficient test cells illustrated in FIG. 11B. The threshold is defined as the average of the reference cells shown in FIG. 11B multiplied by a scaling factor. This process is repeated for each test range, $(r_i, r_j)$, along the diagonal of the correlation coefficient map.

Figure 12A:
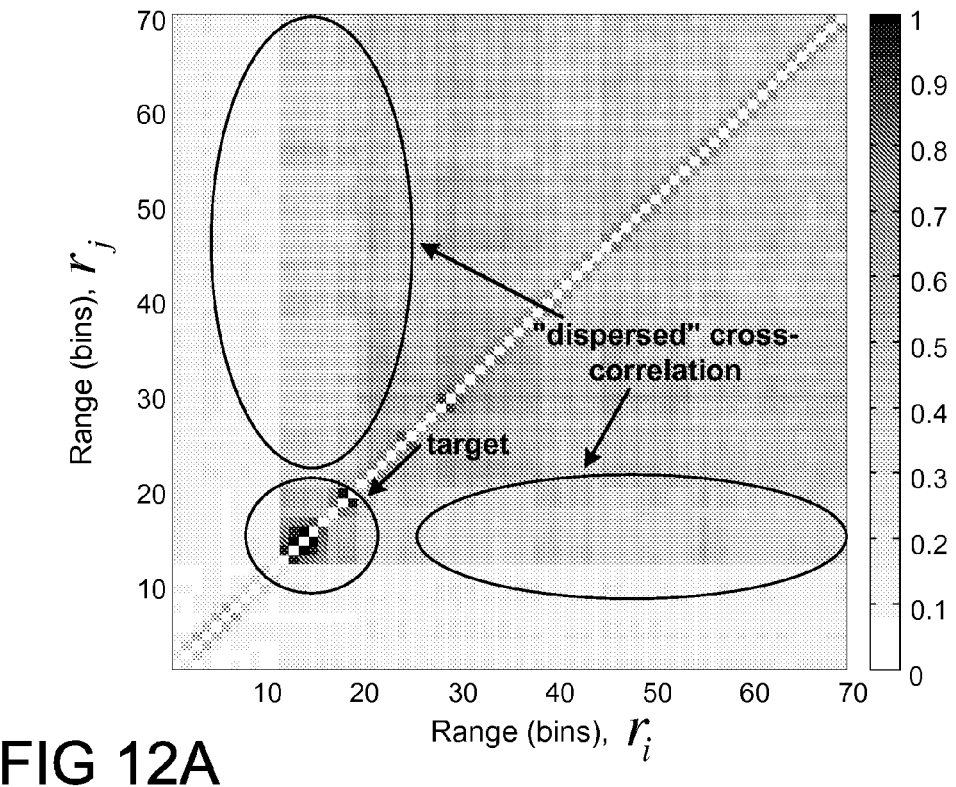
FIG. 12A is an example of a typical correlation coefficient matrix computed from a range-Doppler coherent change detection map for a stationary human target with exhibiting voluntary torso, head, arms, or leg motions in a building or other severe multi-path environment.
Figure 12B:
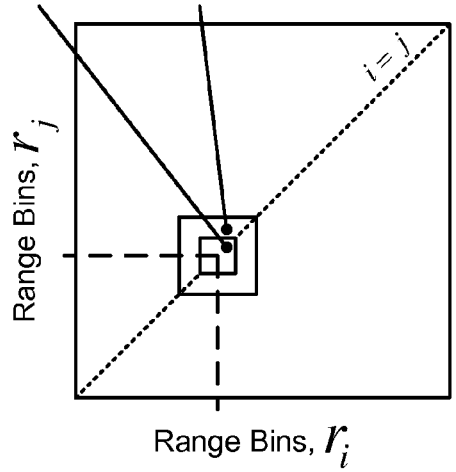
FIG. 12B illustrates an exemplary configuration of the test, guard, and reference cells used for an example of a CFAR detector that operates on the correlation coefficient matrix of a coherent change detection map to detect stationary human target exhibiting voluntary torso, head, arms, or leg motions in a building or other severe multi-path environment.

A third detector 650-11 also operates on the correlation coefficient map computed from range-Doppler maps. An example of a typical correlation coefficient matrix computed from the range-Doppler change detection map is shown in FIG. 12A for a stationary human target that is exhibiting some voluntary motion of torso, head, arms or legs and is located in a high multi-path environment. This detector uses a sliding window to sum correlation coefficients adjacent to the diagonal in the correlation coefficient map. FIG. 12B illustrates the configuration of the test, guard, and reference cells used for a CFAR detector that operates on the correlation coefficient matrix of a coherent change detection map. The test values are defined as the average of the correlation coefficient test cells illustrated in FIG. 12B. The threshold is defined as the average of the reference cells shown in FIG. 12B multiplied by a scaling factor. This process is repeated for each test range, $(r_i, r_j)$ along the diagonal of the correlation coefficient map.

Figure 13:
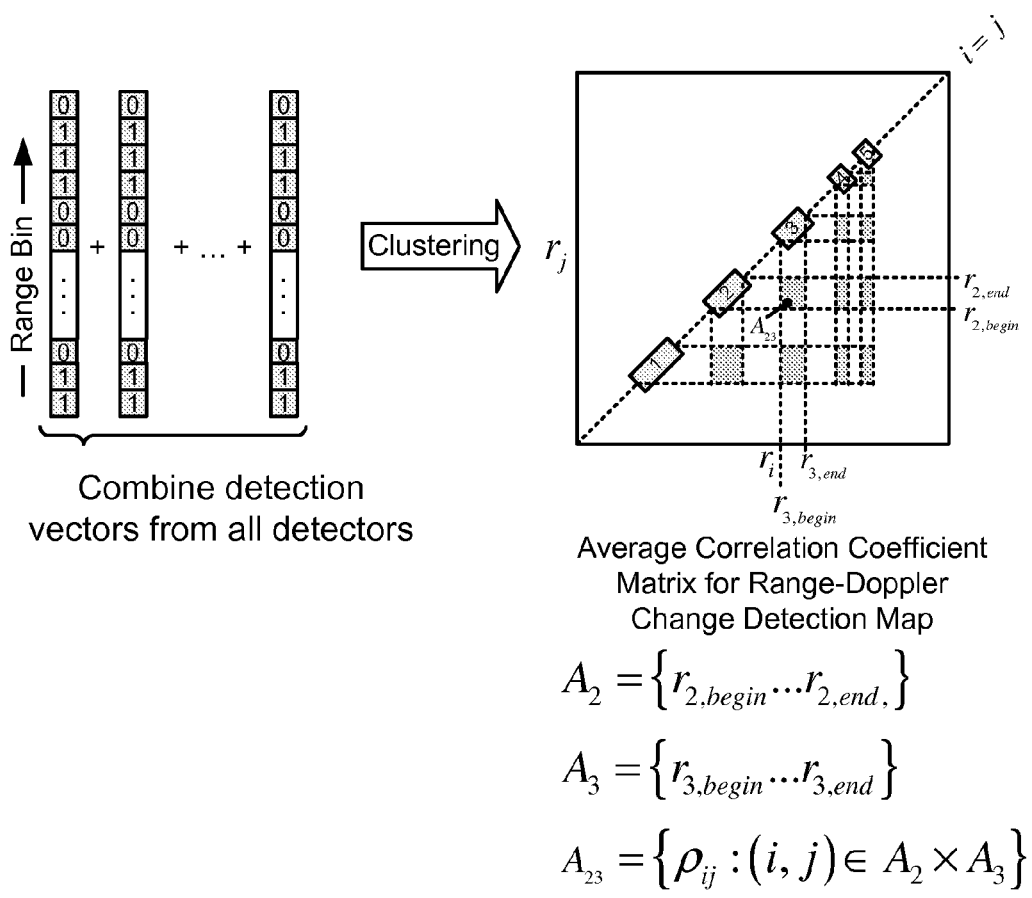
FIG. 13 shows an example of 5 target clusters on the correlation coefficient map, where the cross correlation coefficients between any two clusters are indicated in the shaded region below the diagonal.

The initial detection outputs from each of the three detectors are combined in the sum block 650-12. This can be extended to include additional detectors optimized for other target characteristics or to detect interference sources such as wind blown foliage. The output of the sum block is a 1D boolean array, where each element represents a range bin and indicates whether the bin comprises an area of interest for targets or not. For a typical target, multiple adjacent range bins may be indicated as bins of interest. The clustering block 650-13 takes contiguous range bins of interest and indexes them. Specular multipath returns generally manifest as a separate cluster from the actual target. The cross-correlation of each cluster with the others is measured and compared to a threshold in order to associate clusters together 650-14. FIG. 13 shows an example of 5 target clusters shown on the correlation coefficient map, where the cross correlation coefficients between any two clusters are indicated in the shaded region below the diagonal. This type of combination allows the detector to be extensible in that many different detects can be used, and the problem of duplicating targets with two or more different types of detectors is mitigated.

The Activation step 650-15 examines each group of associated target clusters and identifies the cluster in each group that is closest in range to the sensor and suppresses the others. This is based on the hypothesis that the cluster closest in range is associated with the true target and not the multipath component of the same. A centroiding process 650-16 is used to select a single range-Doppler bin associated with an activated target cluster. The range-Doppler cell is selected from the cluster based on the maximum range-Doppler difference value. The angle is estimated at 650-17 by measuring the phase difference in the original range-Doppler maps between the signals that are incident on two subarrays formed by the beamformer and spaced a half wavelength apart.

Range and angle estimates from the two detector paths for multiple moving and stationary targets are processed with a Kalman tracking filter 650-18. The output of the Kalman tracker feeds a local or remote graphical user interface that shows targets in range and angle relative to the position of the sensor in a plan position indicator display where the sensor is located at the origin. Interference detections from 602-16 are also provided as an input to the Kalman tracker 650-18, and used to terminate tracks that correspond to compromised areas of the range-Doppler map and to track range-Doppler cells with interference. The output of the Kalman tracker feeds the local or remote graphical user interface 670 (FIG. 7) or 604 (FIG. 3) that shows targets in range and angle relative to the position of the sensor in a plan position indicator (PPI)

display where the sensor is located at the origin. Operating ranges affected by interference may also be displayed on the PPI display.

Figure 14:
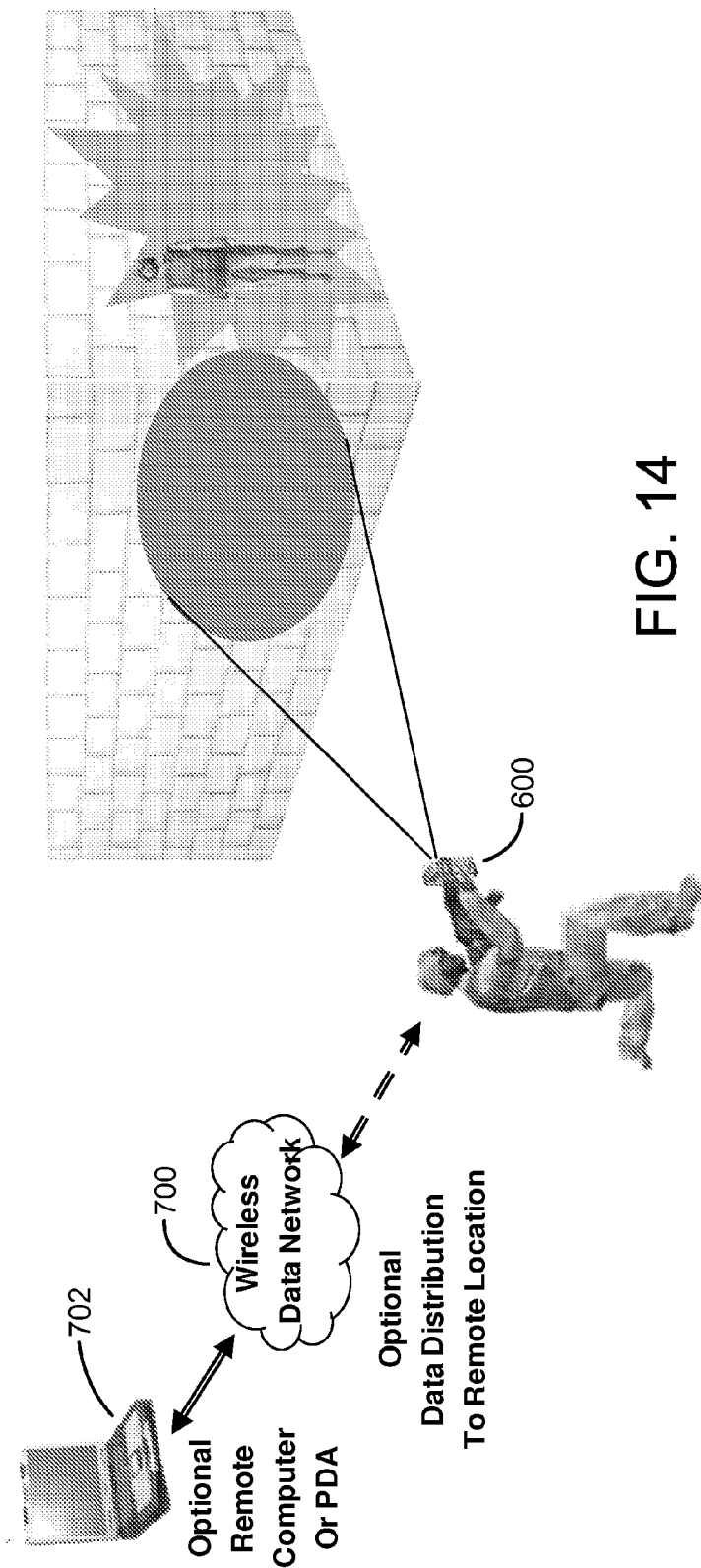
FIG. 14 is a diagrammatic view illustrating an exemplary application for a hand-held STTW sensor.

In a stand-alone sensor mode of operation, the target range and azimuth data is sent to a local display which is implemented as part of operator interface 604 (FIG. 3) for hand held use, and a wireless remote display in the form of a PDA or a laptop, and/or another networked sensor for bi-static or multi-static operation. FIG. 14 diagrammatically illustrates a stand-alone sensor application, in which sensor 600 is used to sense a person through a wall or inside a building. Data may optionally be distributed by a wireless data network 700 to a remote computer or PDA 702 in this application.

In an exemplary embodiment, each STTW sensor may be equipped with a standard data interface such as Ethernet or USB for connection to a local area network which may or may further be a wireless network such as network 700 in FIG. 14. Wireless network connectivity enables a cooperative mode of operation that improves performance as a result of an extended distributed baseline where the system may take advantage of multiple look angles at the target area. This mode of operation is further enabled by embedded and attached geo-location subsystems and relative location determination capabilities, as described in co-pending application Ser. No. 12/462,365, the entire contents of which are incorporated herein by this reference.

Figure 15:
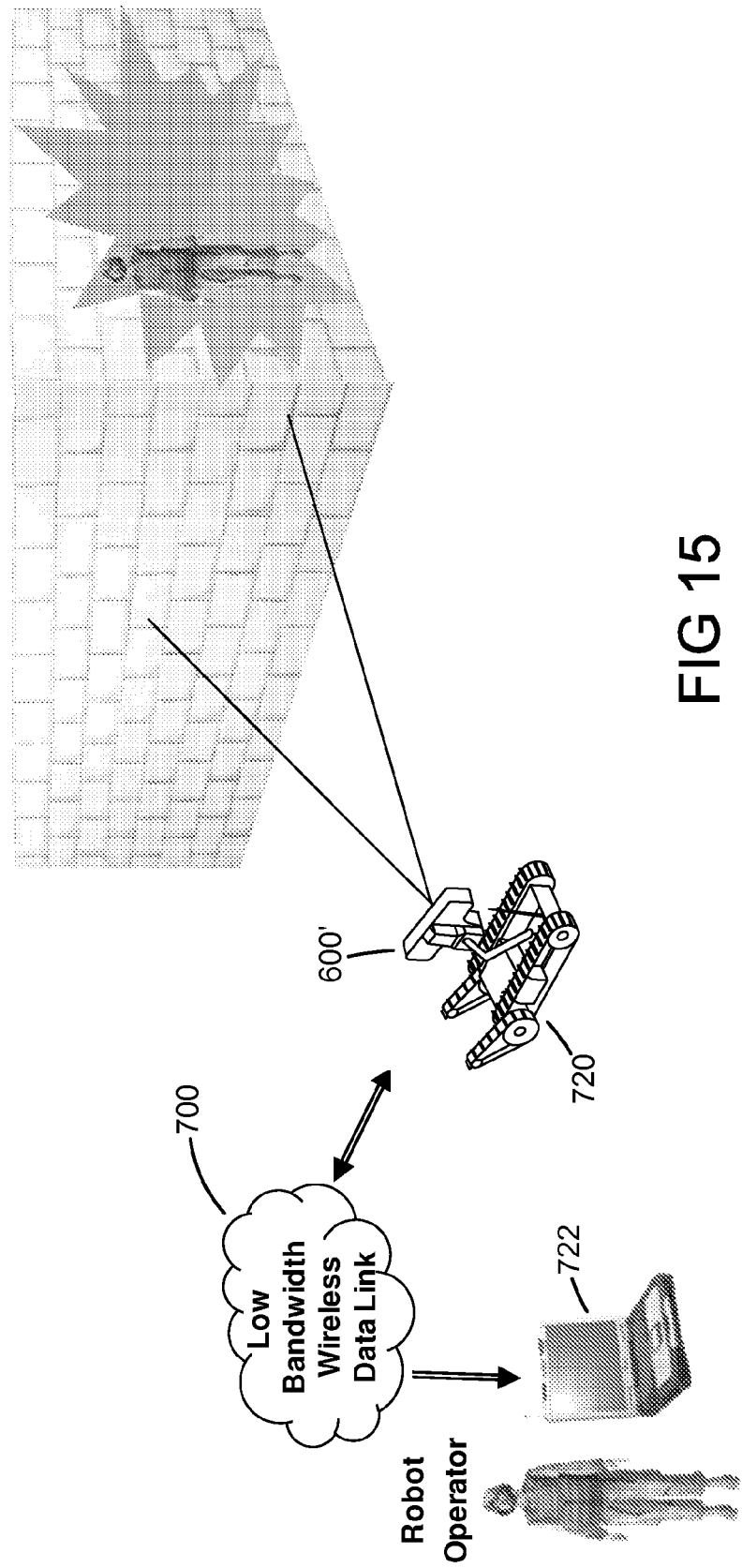
FIG. 15 is a diagrammatic view illustrating an exemplary application for a robot-mounted STTW sensor system.

FIG. 15 diagrammatically depicts an embodiment in which the STTW sensor 600' is mounted on a robot vehicle 720 such as, by way of example only, a PackBot™, operated remotely by an operator, with sensor data sent by a wireless data link 700 to a control terminal 722 with a remote sensor display.

Figure 16:
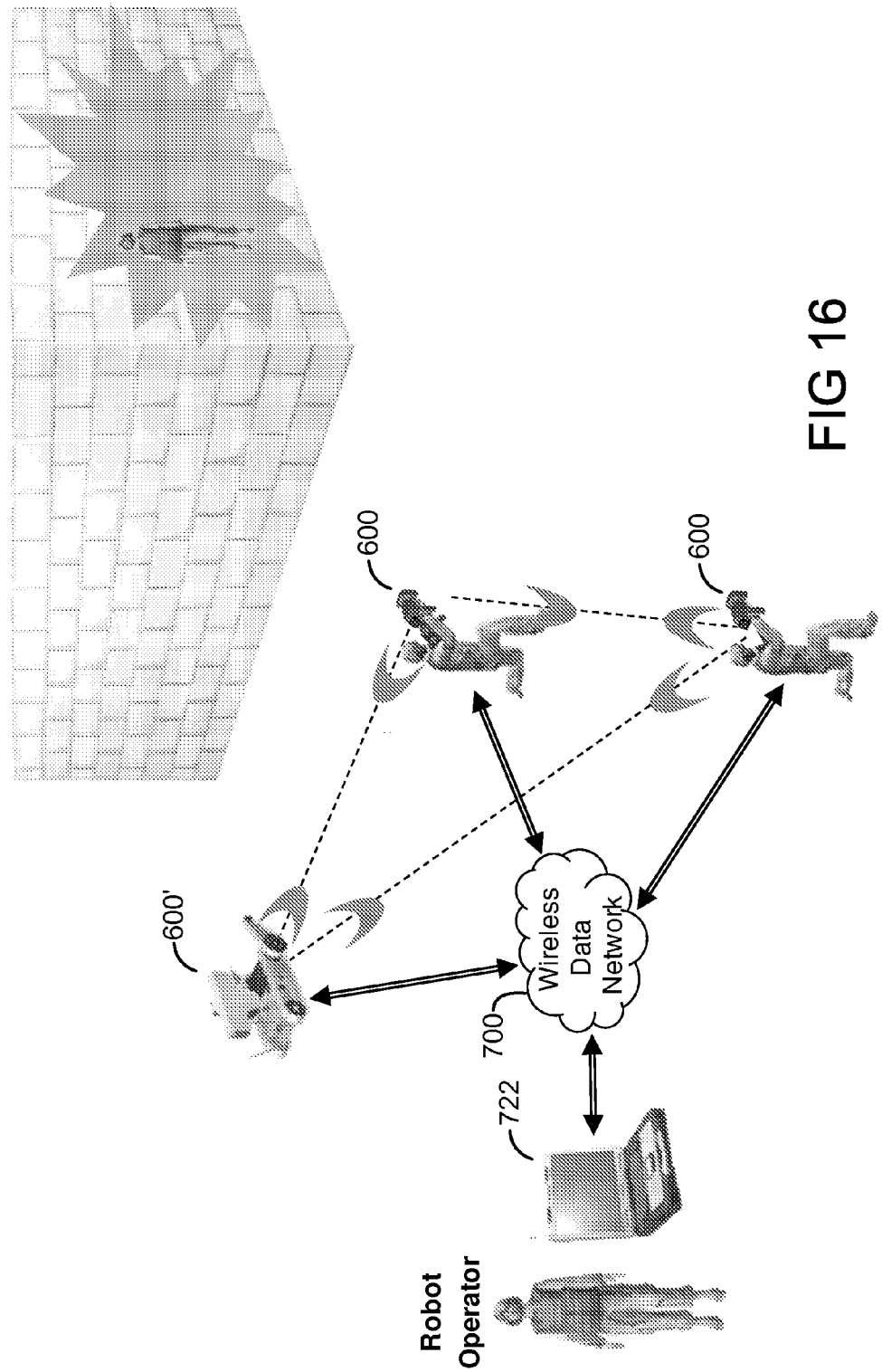
FIG. 16 is a diagrammatic view illustrating an exemplary network of hand-held and robot-mounted STTW sensors.

FIG. 16 diagrammatically shows an embodiment in which hand-held sensors 600 and robot-mounted sensor 600' are interconnected by a wireless data link 700 and to remote terminal 722 to form a sensor network.

Although the foregoing has been a description and illustration of specific embodiments of the s, various modifications and changes to the subject matter can be made by persons skilled in the art without departing from the scope and spirit of the invention as defined by the following claims.

What is claimed is:

1. A method for sensing a target through a wall or obstruction by a Moving Target Indicator (MTI) radar sensor and including a transmitter and a receiver, comprising:
   transmitting a series of radar pulses at frequencies less than about 5 GHz;
   receiving radar return signals from a plurality of receive antenna array subapertures;
   processing the radar return signals from each of the plurality of receive antenna subapertures in respective receive channels each corresponding to a respective receive antenna subaperture to:
      digitize analog radar return signals and provide complex time samples of the radar return signals;
      process the complex time samples by a digital beamformer to form multiple beams;
      process the beamformer outputs through a complex FFT processor to provide a range matrix map of clutter and targets for each channel;
      process a time series of range matrix maps comprising a coherent processing interval through a Doppler compression function to provide range-Doppler maps indicating moving target velocities at each range;
   performing target detection processing on the outputs of the Doppler compression function for each channel to detect moving and stationary targets through a plurality of parallel target detection signal processing paths, to provide target detection signals representing detected moving and stationary targets and their range and angular location; and
   providing the target detection signals to an operator interface.

2. The method of claim 1, wherein said target detection processing comprises estimating an angular location by measuring a phase difference between a plurality of channel subapertures formed by the digital beamformer using a phase monopulse angle estimator.

3. The method of claim 1, wherein a first one of said target detection signal processing paths provides detection of human walking targets.

4. The method of claim 3, wherein said first one of said target detection signal processing paths is configured to identify walking targets in range based on Doppler filter amplitudes in each channel using an adaptive detection threshold.

5. The method of claim 4, wherein said first one of said target detection signal processing paths is configured to:
   excise Doppler cells around zero hertz containing stationary clutter signals;
   sum energy in remaining Doppler filters at each range bin;
   detect targets in each channel by determining Doppler energy peaks in each range bin;
   sending the detected targets in each channel to a phase monopulse angle estimator to determine estimated target angular locations for each target;
   sending estimated range and angle information of detected walking targets to a Kalman filter for target tracking.

6. The method of claim 5, wherein said detecting targets in each channel comprises centroiding each detected target to a single range-Doppler cell.

7. The method of claim 3, wherein a second one of said target detection signal processing paths provides detection of human targets that exhibit very small and involuntary motion consistent with standing or sitting in one spot.

8. The method of claim 7, wherein said second one of the target detection signal processing paths is configured to detect targets with radial velocities very near zero Hz, and comprises filtering said range-Doppler maps using a Finite Impulse Response (FIR) high pass filter; and
   applying a plurality of different detection processes specific to different observed target characteristics in the change detection map and in the correlation coefficients of the change detection map.

9. The method of claim 8, wherein said applying a plurality of different detection processes comprises applying a first detection process configured to detect slowly moving targets.

10. The method of claim 8, wherein said applying a plurality of different detection processes comprises applying a second detection process configured to detect intentionally still human targets.

11. The method of claim 8, wherein said applying a plurality of different detection processes comprises applying a third detection process configured to detect a stationary human target that is exhibiting some voluntary motion of torso, head, arms or legs and is located in a high multi-path environment.

12. The method of claim 1, wherein said transmitting a series of radar pulses comprises transmitting a pulse group of chirped pulses at a pulse group repetition rate, and wherein the transmitter and receiver are powered down during intra-pulse periods between the pulse groups.

13. The method of claim 1, further comprising:
   determining whether high levels of RF interference exists in an operating environment which would compromise performance of the MTI sensor.

14. The method of claim 13, wherein said determining whether high levels of RF interference exist comprises:
   operating the sensor in a receive only mode;
   processing signals from one of the receiver channels in a complex FFT processor to form a range matrix map;
   performing a two-dimensional FFT using the range matrix map to form a range-Doppler map;
   applying a fixed threshold detection for each range-Doppler map to test for noise and interference levels that would compromise performance of the MTI sensor.

15. The method of claim 13, further comprising:
   processing RF interference signals to determine range-Doppler cells with interference and to terminate target tracks that correspond to compromised areas of a range-Doppler map.

16. The method of claim 1, wherein the MTI sensor is a hand-held device.

17. The method of claim 1, wherein the MTI sensor is mounted on a vehicle.

18. A portable hand-held Moving Target Indicator (MTI) radar sensor for sensing a target through a wall or obstruction, comprising:
   a transmitter for transmitting a series of radar pulses at L-band or S-band;
   an antenna array including a transmit subaperture coupled to the transmitter and a plurality of receive subapertures;
   a radar receiver responsive to radar return signals from each of the plurality of receive subapertures for generating time domain signals representative of radar return signals in a plurality of receiver channels;
   an operator interface including a display;
   a radar signal processor configured to process the radar return signals from each of the plurality of receive subapertures in the respective receiver channels, the processor configured to:
      digitize analog radar return signals and provide complex time samples of the radar return signals;
      process the complex time samples by a digital beamformer to form multiple overlapping beams spaced across the radar field of view;
      process the beamformer outputs through a complex FFT processor to provide a range matrix map of clutter and targets for each channel;
      process the range matrix maps through a Doppler compression function over multiple range matrix maps comprising a coherent processing interval to provide range-Doppler maps indicating moving target velocities at each range;
      perform target detection processing on the output of the Doppler compression function for each channel to detect walking and stationary targets through a plurality of parallel target detection signal processing paths, to provide target detection signals representing detected walking and stationary targets and their range and angular location; and
      provide the target detection signals to the operator interface.

19. The sensor of claim 18, wherein the processor further includes a phase monopulse angle estimator to estimate angular locations of detected targets.

20. The sensor of claim 18, wherein the radar processor further comprises:
   an RF interference detector for detecting RF interference in an operating environment which would compromise performance of the sensor, the interference detector operating in a receive-only mode of the sensor.

21. The sensor of claim 20, wherein the RF interference detector further comprises:
   a processor for processing RF interference signals to determine range-Doppler cells with interference and to terminate target tracks that correspond to compromised areas of a range-Doppler map.

* * * * *